(12) United States Patent
Shirakawa (10) Patent No.: US 7,443,447 B2
(45) Date of Patent: Oct. 28, 2008

(54) CAMERA DEVICE FOR PORTABLE EQUIPMENT

(75) Inventor: Hirotsugu Shirakawa, Tokyo (JP)

(73) Assignee: NEC Corporation, Tokyo (JP)

( * ) Notice: Subject to any disclaimer, the term of this patent is extended or adjusted under 35 U.S.C. 154(b) by 708 days.

(21) Appl. No.: 10/323,847

(22) Filed: Dec. 20, 2002

(65) Prior Publication Data

US 2003/0117501 A1   Jun. 26, 2003

(30) Foreign Application Priority Data

Dec. 21, 2001   (JP)   ............................. 2001-389741

(51) Int. Cl.
*H04N 5/225* (2006.01)
*H04N 9/09* (2006.01)
*H04N 9/097* (2006.01)

(52) U.S. Cl. ..................... 348/376; 348/262; 348/373; 455/556.1

(58) Field of Classification Search ............. 348/218.1, 348/373, 374, 375, 376, 262, 14.01; 455/556.1, 455/556.2
See application file for complete search history.

(56) References Cited

U.S. PATENT DOCUMENTS

| 5,157,499 | A | * | 10/1992 | Oguma et al. ............... 348/294 |
| 6,141,036 | A | * | 10/2000 | Katayama et al. ............ 348/47 |
| 6,456,335 | B1 | | 9/2002 | Miura et al. |
| 6,639,626 | B1 | * | 10/2003 | Kubo et al. .............. 348/218.1 |
| 6,727,939 | B1 | * | 4/2004 | Stekelenburg ............... 348/158 |
| 7,277,117 | B2 | * | 10/2007 | Takashima et al. ........ 348/14.09 |
| 2001/0004269 | A1 | * | 6/2001 | Shibata et al. ......... 348/333.06 |

FOREIGN PATENT DOCUMENTS

| EP | 0 690 618 A1 | 1/1996 |
| GB | 2 212 356 A | 7/1989 |
| GB | 2 341 053 A | 8/1998 |
| GB | 2 355 126 A | 4/2001 |
| JP | 11-298869 | * 10/1999 |
| JP | 2001-169166 A | 6/2001 |
| WO | WO0131893 A1 | * 3/2001 |
| WO | WO 01/31893 A1 | 5/2001 |
| WO | WO 01/95630 A1 | 12/2001 |

* cited by examiner

*Primary Examiner*—Tuan Ho
*Assistant Examiner*—Richard M Bemben
(74) *Attorney, Agent, or Firm*—Sughrue Mion, PLLC (57) ABSTRACT

A camera device captures a plurality of images and superimposes them to output image data of a superimposed image. The plurality of images are captured by a plurality of cameras. A processor superimposes the plurality of images to produce the superimposed image, which is displayed on screen and is sent by moving-image mail.

20 Claims, 9 Drawing Sheets

SUPERIMPOSED IMAGE DATA

CAMERA DEVICE FOR PORTABLE EQUIPMENT

BACKGROUND OF THE INVENTION

1. Field of the Invention

The present invention relates to a portable device equipped with a digital camera for capturing still and moving images and, in particular, to a camera device built in a portable device such as a portable/mobile telephone or a portable terminal.

2. Description of the Related Art

There have been proposed several portable terminals which are equipped with two CCD (Charge-Coupled Device) cameras to capture both the scenery a user just sees and the face of the user.

Japanese Patent Application Unexamined Publication No. 2001-169166 discloses a portable terminal having a first CCD camera provided in a hinge portion and a second CCD camera provided on the front surface of a display-equipped housing that is rotatably coupled with a keypad-equipped housing.

Japanese Patent Application Unexamined Publication No. 10-108152 discloses a foldable terminal having two CCD cameras each rotatably supported at the right and left upper end portions of a display-equipped housing.

However, in the above prior arts, the captured images by the CCD cameras are processed by a microprocessor of the portable terminal. More specifically, the captured images are stored in a memory and then combined to produce an image in which the user's face image is superimposed on the scenery image. Accordingly, the load on the microprocessor is increased and further an increased number of signal wires is needed to electrically connect the cameras to the microprocessor.

SUMMARY OF THE INVENTION

An object of the present invention is to provide a camera device allowing the load on a microprocessor of a portable device to be lightened.

Another object of the present invention is to provide a camera device allowing easy connection of a plurality of cameras to the microprocessor without increasing the number of signal wires between them.

According to the present invention, a camera device captures a plurality of images and superimposes them to output image data of a superimposed image. The camera device includes: a plurality of cameras directed in different directions, each of the cameras capturing an image to produce image data; and a processor for superimposing image data each captured by the cameras to produce output data of a superimposed image.

According to one aspect of the present invention, a camera device for a portable communication terminal, includes: at least two cameras including a back camera and a front camera which are each provided in the back and front of the portable communication terminal, wherein each of said at least two cameras captures an image to produce image data; a memory for storing image data produced by each of said at least two cameras; and a processor for processing image data each captured by said at least two cameras to produce output data of a superimposed image.

The processor may sequentially select the image data produced by said at least two cameras in units of one of a horizontal line and a frame to store them onto the memory. Alternatively, a selector may be provided to sequentially select the image data produced by said at least two cameras in units of one of a horizontal line and a frame to store them onto the memory.

According to another aspect of the present invention, in a portable communication terminal having at least two cameras including a back camera and a front camera which are each provided in the back and front of the portable communication terminal, wherein each of said at least two cameras captures an image to produce image data, a method for capturing a plurality of images includes the steps of: inputting image data from each of said at least two cameras; selecting the image data in units of one of a horizontal line and a frame to storing the image data in a memory; superimposing the image data stored in the memory to produce a superimposed image data such that one image is superimposed on another.

According to the present invention, a method for capturing a plurality of images includes the steps of: inputting image data from each of said at least two cameras; selecting first image data to storing it in a memory; reducing a size of second image data to storing the second image data in the memory such that the second image data is overwritten on the first image data; and outputting a superimposed image data such that a second image of the second image data is superimposed on a first image of the first image data.

According to the present invention, a portable communication terminal with a moving-image communication function, includes: a display; an operation key section; a main circuit section including a microprocessor of the portable communication terminal; and a camera section, wherein the camera section comprises: a back camera provided in the back of the portable communication terminal; a front camera provided in the front of the portable communication terminal; a memory for storing image data produced by each of the back and front cameras; and a processor for processing image data each captured by the back and front cameras to produce output data of a superimposed image, wherein the microprocessor instructs the display to display the superimposed image to be sent.

As described above, a plurality of images are superimposed to output image data of a superimposed image. Accordingly, the camera device can output the superimposed image to the main circuit of the portable device, resulting in enhanced miniaturization and cost-performance and further a reduced number of signal wires connecting the camera device to the main circuit. In addition, the position and/or size of the front image on the display can be changed by a use operating the operation key section.

DESCRIPTION OF THE PREFERRED EMBODIMENTS

Hereafter, a camera device built in a portable telephone will be described as an example. The camera device is capable of capturing still/moving images and processing them to produce a superimposed still/moving image, which is output to an electronic circuit of the portable telephone. The portable telephone can send the superimposed still/moving image as a moving-image mail to a destination terminal.

Figure 1:
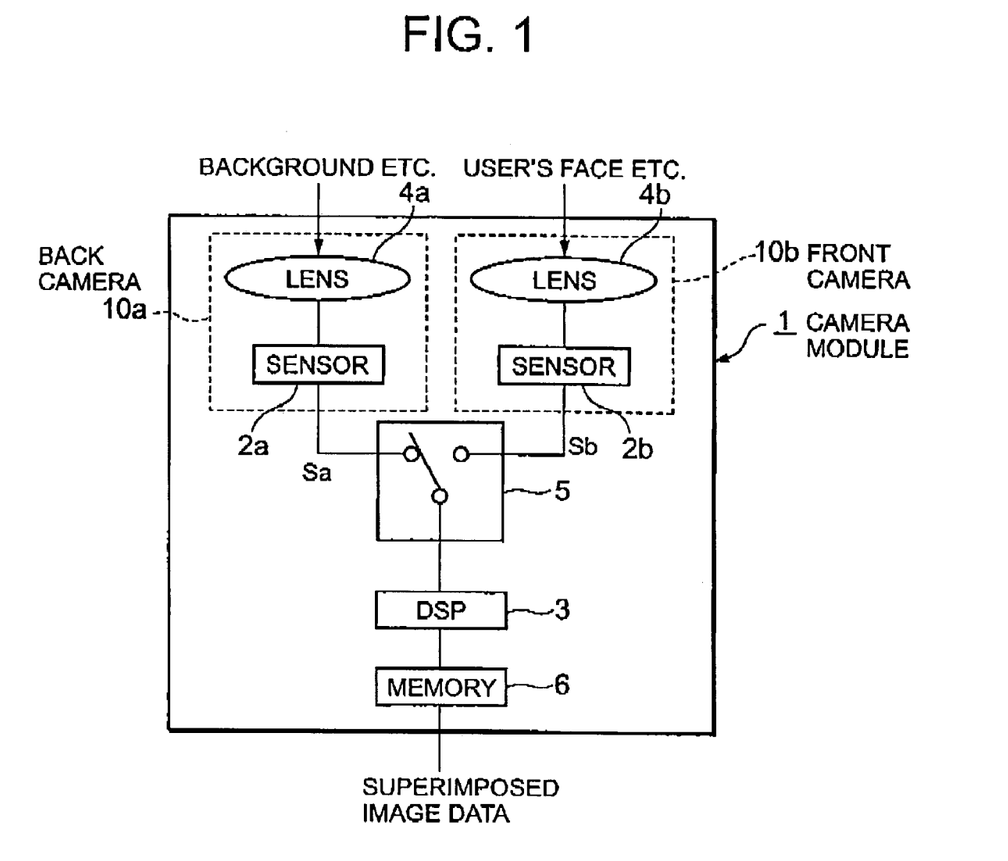
FIG. 1 is a block diagram showing a camera device built in a portable terminal according to a first embodiment of the present invention.

Referring to FIG. 1, a camera device 1 according to a first embodiment of the present invention is provided with a back camera 10a and a front camera 10b, which are provided at desired positions on the back and the front of a display-equipped housing of the portable telephone, respectively.

The back camera 10a includes a lens 4a and an image sensor 2a and the front camera 10b includes a lens 4b and an image sensor 2b. An arbitrary type of image sensor can be used as the image sensors 2a and 2b. For example, the image sensors 2a and 2b are CMOS or CCD image sensors. The image sensors 2a and 2b may have the same number of pixels or the different number of pixels. The number of pixels of the image sensor 2a may be greater than that of the image sensor 2b.

Since the back camera 10a is normally used to capture a scenery, it may provide a narrow angle of view to use only the center portion of the lens 4a exhibiting superior optical properties. Since the front camera 10b may be used to capture a user's face during telephone conversation, it preferably provides a wide angle of view so as to capture the user's face near the portable telephone allowing hands-free communication. The lens 4a and the image sensor 2a of the back camera 10a may be dedicated to capturing scenery. Similarly, the lens 4b and the image sensor 2b of the back camera 10b may be dedicated to capturing people. The details of lens arrangement, color filters and IR-cut filters may be arbitrarily set.

The image sensor 2a captures a background image that is the same as seen by the user, to sequentially output background image data Sa in units of a horizontal line or a frame. Similarly, the image sensor 2b captures a foreground image such as a user's face to sequentially output foreground image data Sb in units of a horizontal line or a frame.

The background image data Sa and the foreground image data Sb are alternately selected in units of a horizontal line or a frame by a selector 5 under control of a digital signal processor (DSP) 3. When the user selects one of the back camera 10a and the front camera 10b by operating a keypad of the portable telephone, the DSP 3 may fix the selector 5 to select the user-selected one of the background image data Sa and the foreground image data Sb.

Under the control of the DSP 3, the background image data Sa and/or the foreground image data Sb are stored in a memory 6 and then processed to produce data of a superimposed image of the background and foreground images. The superimposed image data is output to the microprocessor of the portable telephone. The image processing of the DSP 3 will be described later.

Figure 2:
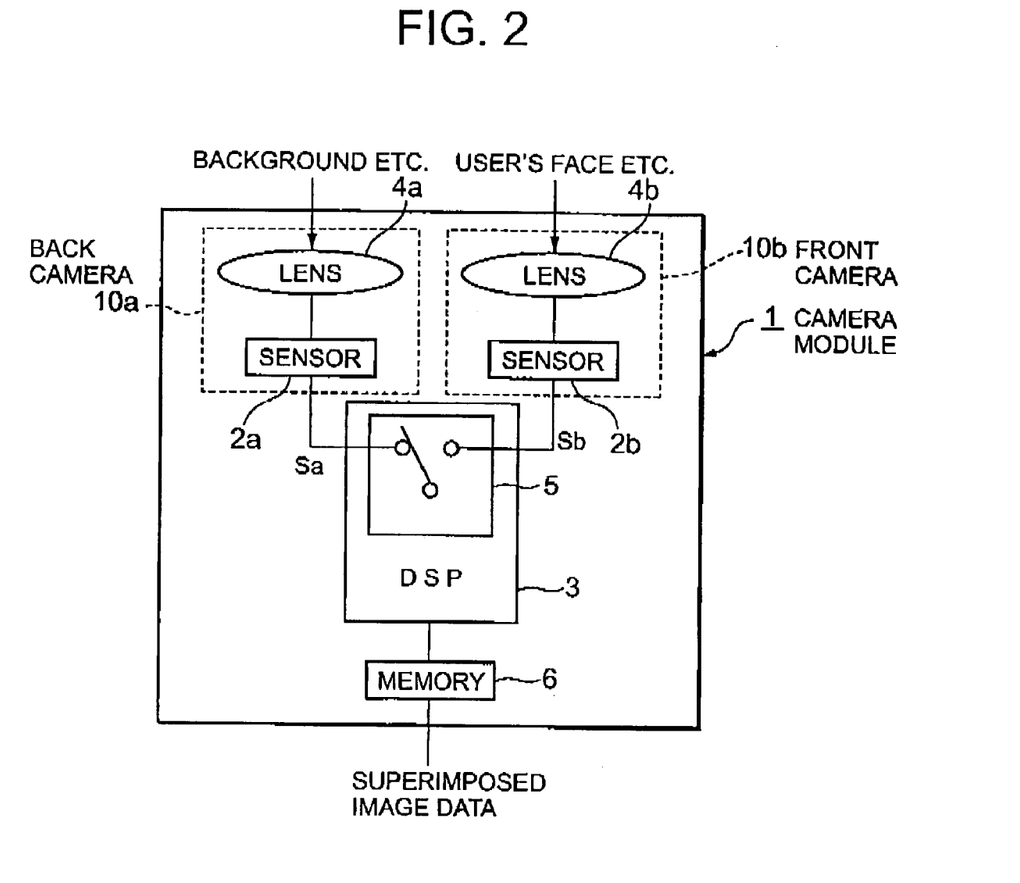
FIG. 2 is a block diagram showing a camera device built in a portable terminal according to a second embodiment of the present invention.

As shown in FIG. 2, in a camera device 1 according to a second embodiment of the present invention, the selector b is implemented in the DSP 3. The other blocks and operations are the same as described in the first embodiment.

Figure 3A:
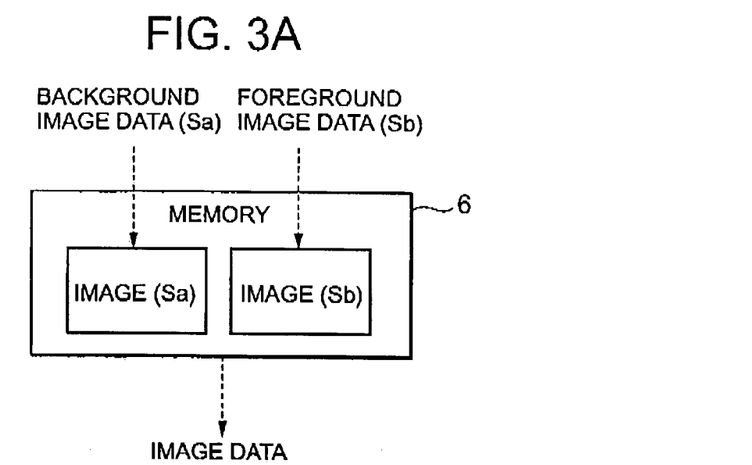
FIG. 3A is a schematic diagram showing an example of stored image data in a memory.
Figure 3B:
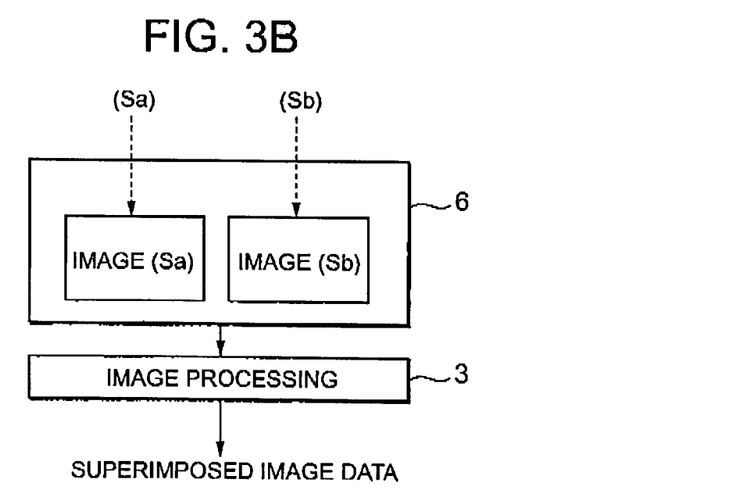
FIG. 3B is a diagram showing a sequence of processing of the stored image data of FIG. 3A.

Referring to FIGS. 3A and 3B, in the case of a sufficient amount of memory, both the background image data Sa and the foreground image data Sb are stored in the memory 6. In this case, the size (or the number of pixels) of the foreground image (Sb) may be smaller than that of the background image (Sa). Thereafter, as shown in FIG. 3B, the DSP 3 performs the image processing of the background image data Sa and the foreground image data Sb stored in the memory 6 to easily produce superimposed image data. The image processing includes superimposing, resizing, position changing of images and switching between a foreground and a background.

Figure 3C:
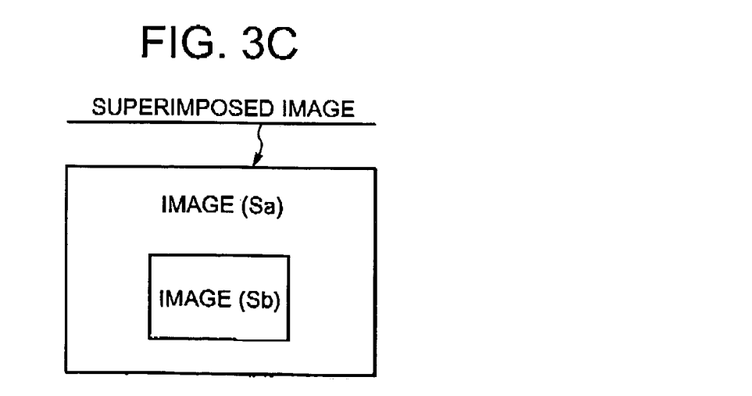
FIG. 3C is a diagram showing an example of a superimposed image produced by the processing.

As shown in FIG. 3C, the superimposed image is composed of the background image (Sa) in which the foreground image (Sb) is included. The foreground image (Sb) may be displayed as a small-sized child window on a parent window of the background image (Sa). The user can instruct the DSP 3 by operating the keypad to change the position of the foreground image (Sb) in horizontal and/or vertical directions within the background image (Sa). Since the background image data Sa and the foreground image data Sb are stored in the memory 6, there is no need of inputting image data each time the size or position of the foreground image (Sb) is changed.

Figure 4A:
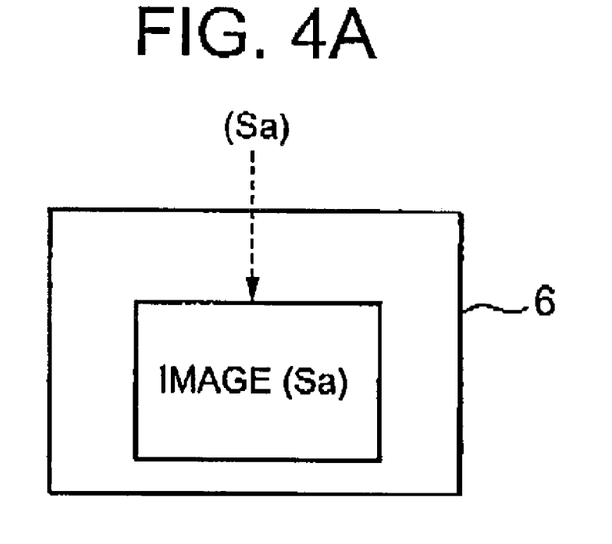
FIG. 4A is a diagram showing an example of stored background image data in a memory.
Figure 4B:
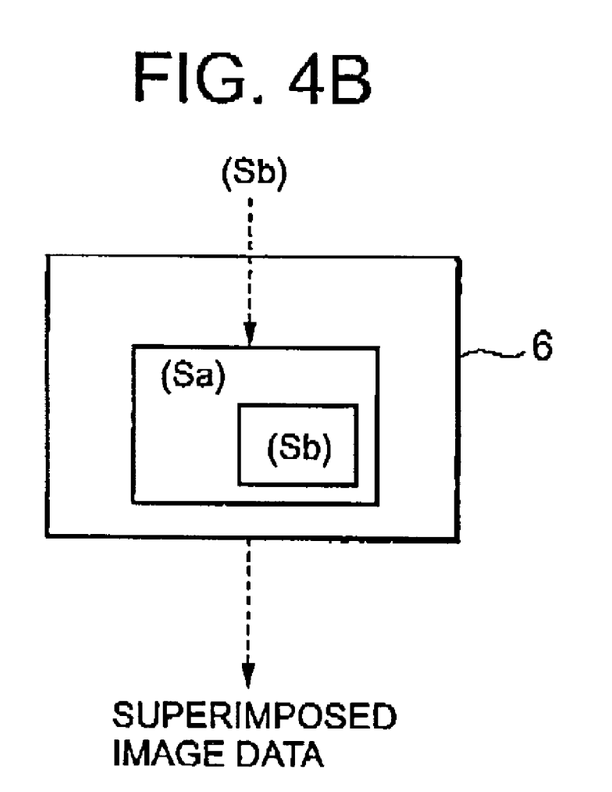
FIG. 4B is a diagram showing an example of a superimposed image data in the memory.

Referring to FIGS. 4A and 4B, in the case of a small amount of memory, the background image data Sa is first stored in the memory 6. Thereafter, the foreground image data Sb is reduced in size by the DSP 3 and is stored in the memory 6 so as to be overwritten on a preset region of the background image data Sa as shown in FIG. 3C. Each time the size or position of the foreground image (Sb) is changed, the DSP 3 inputs the background image data Sa and the foreground image data Sb from the image sensors 2a and 2b.

Figure 5:
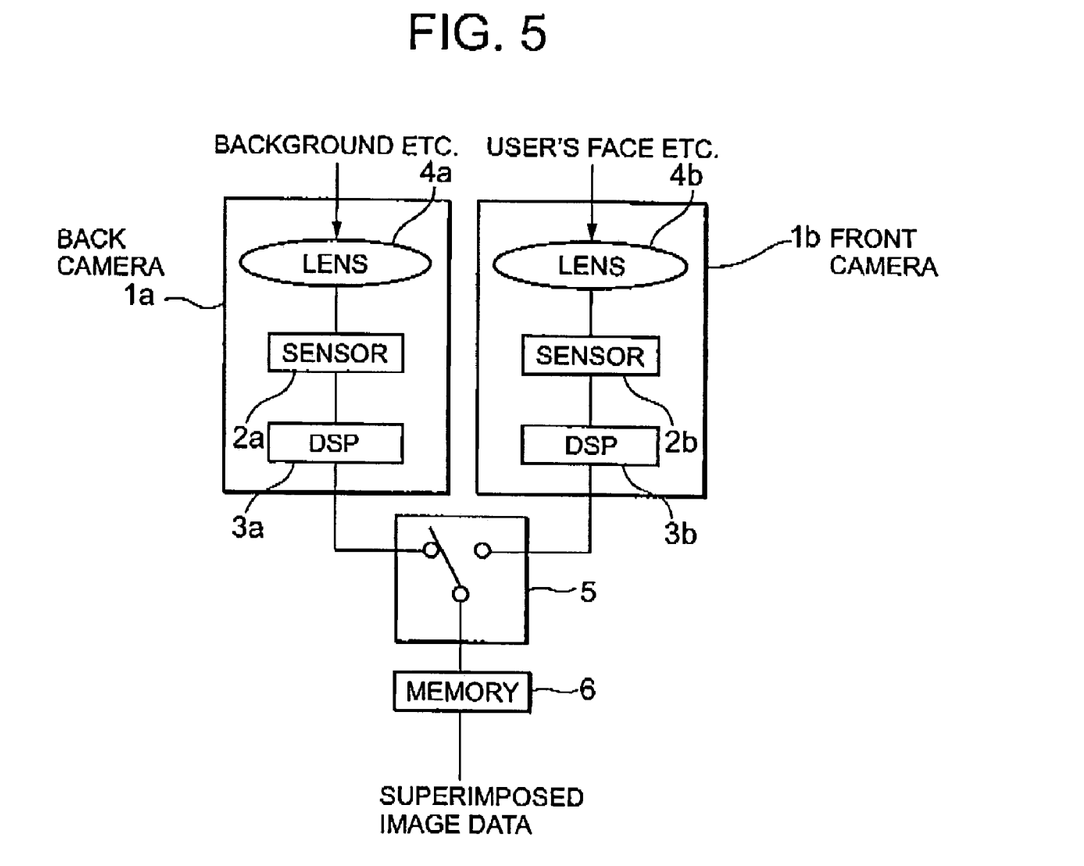
FIG. 5 is a block diagram showing a camera device having separate cameras built in a portable terminal according to a third embodiment of the present invention.

As shown in FIG. 5, a camera device 1 according to a third embodiment of the present invention is provided with a back camera 1a and a front camera 1b, which are separately provided. The back camera 1a is composed of the lens 4a, the image sensor 2a and a DSP 3a and the front camera 1b is composed of the lens 4b, the image sensor 2b and a DSP 3b.

The background image is captured by the image sensor 2a and the DSP 3a processes it in units of a frame to store the memory 6 through the selector 5. The foreground image is captured by the image sensor 2b and the DSP 3b processes it in units of a frame to store the memory 6 through the selector 5. The selector 5 is control led by the DSP 3a and DSP 3b which cooperate to produce a superimposed image on the memory 6 or may be further controlled by a controller (not shown).

Alternatively, the selector 5 and the memory 6 may be provided in the circuit of the portable telephone. Specifically, the microprocessor of the portable telephone implements the selector 5 and the memory 6 to produce the superimposed image. In this embodiment, it is necessary to connect the DSP 3a and the DSP 3b to the microprocessor by signal wires.

Figure 6:
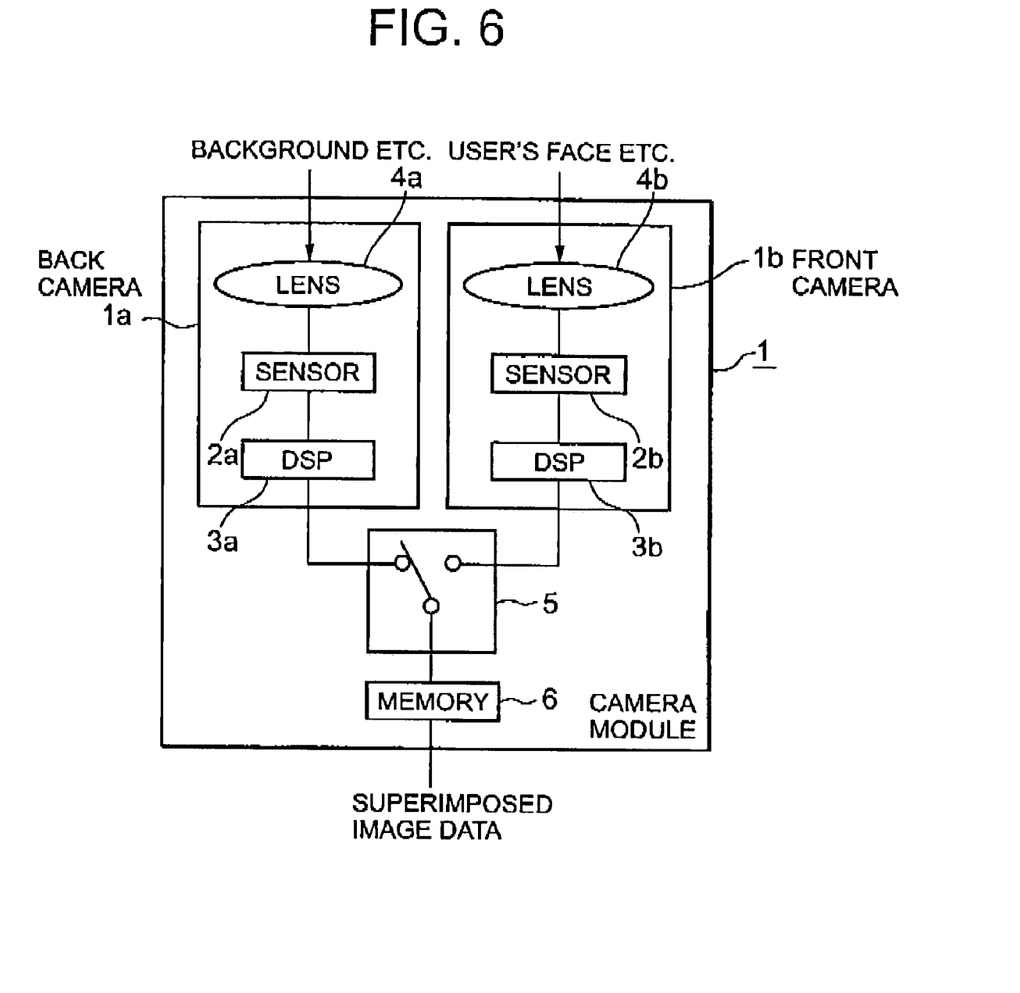
FIG. 6 is a block diagram showing a camera device including the separate cameras, which are built in a portable terminal, according to a fourth embodiment of the present invention.

As shown in FIG. 6, a camera device 1 according to a fourth embodiment of the present invention is a camera module including the back camera 1a, the front camera 1b, the selector 5 and the memory 6, which are the same as shown in FIG. 5. Since these components are incorporated in the module, the number of signal wires for interface to the subsequent stage can be reduced.

When each of the back camera 1a and the front camera 1b does not output any signal, its output impedance can be set to high. In this case, the output signal wires of the back camera 1a and the front camera 1b can be directly connected and therefore the selector 5 can be omitted.

Figure 7:
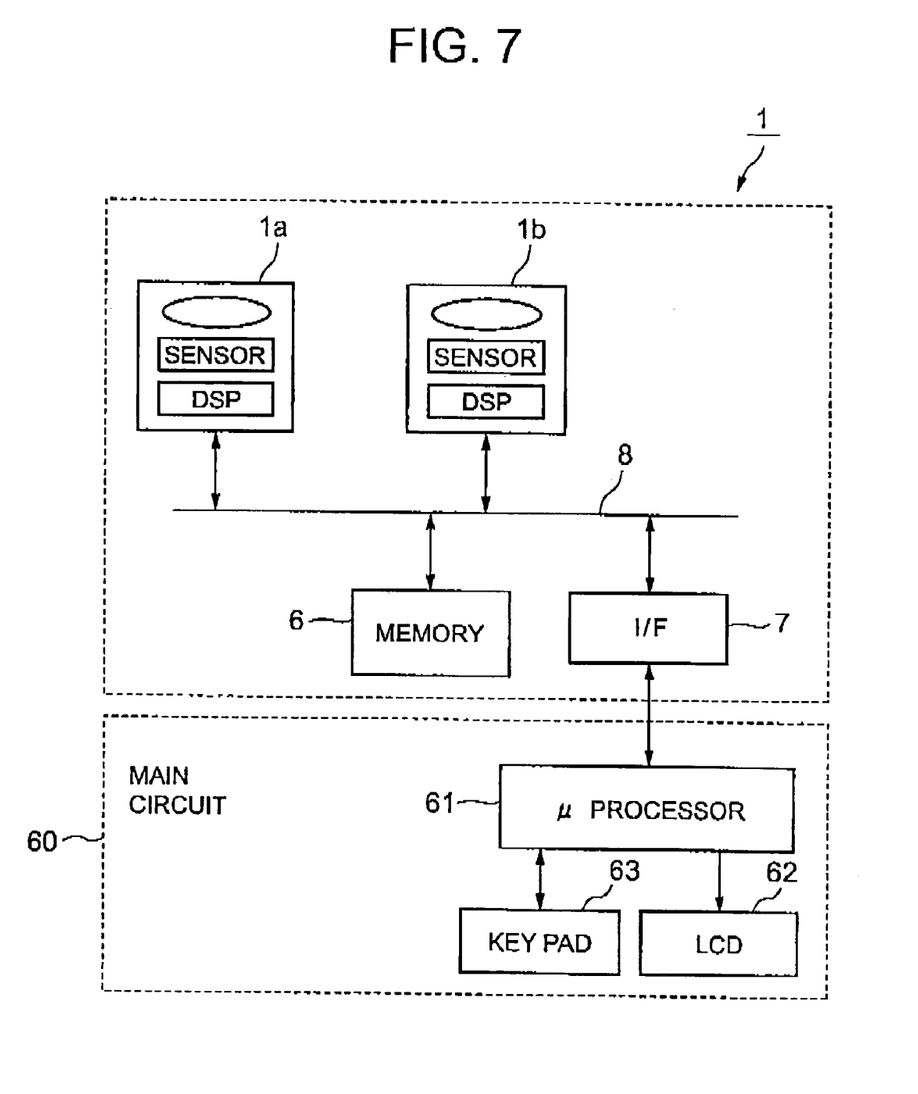
FIG. 7 is a block diagram showing a camera device built in a portable terminal according to a fifth embodiment of the present invention.

As shown in FIG. 7, more specifically, the output terminals of the back camera 1a and the front camera 1b are connected to a bus 8 having the memory 6 and an interface 7 connected thereto. In this embodiment, each of the back camera 1a and the front camera 1b is provided with a chip select terminal. Alternatively, they have unique addresses assigned thereto. A controller (not shown) may be connected to the bus 8 to control data transfer. The superimposed image data is output to a microprocessor 61 of a main circuit 60 of the portable telephone via the interface 7. The microprocessor 61 controls a display (LCD) 62 to display the superimposed image on screen. The user can enter various commands or instructions through a keypad 63.

A more detailed circuit of the second embodiment as shown in FIG. 2 will be described by referring to FIG. 8.

Figure 8:
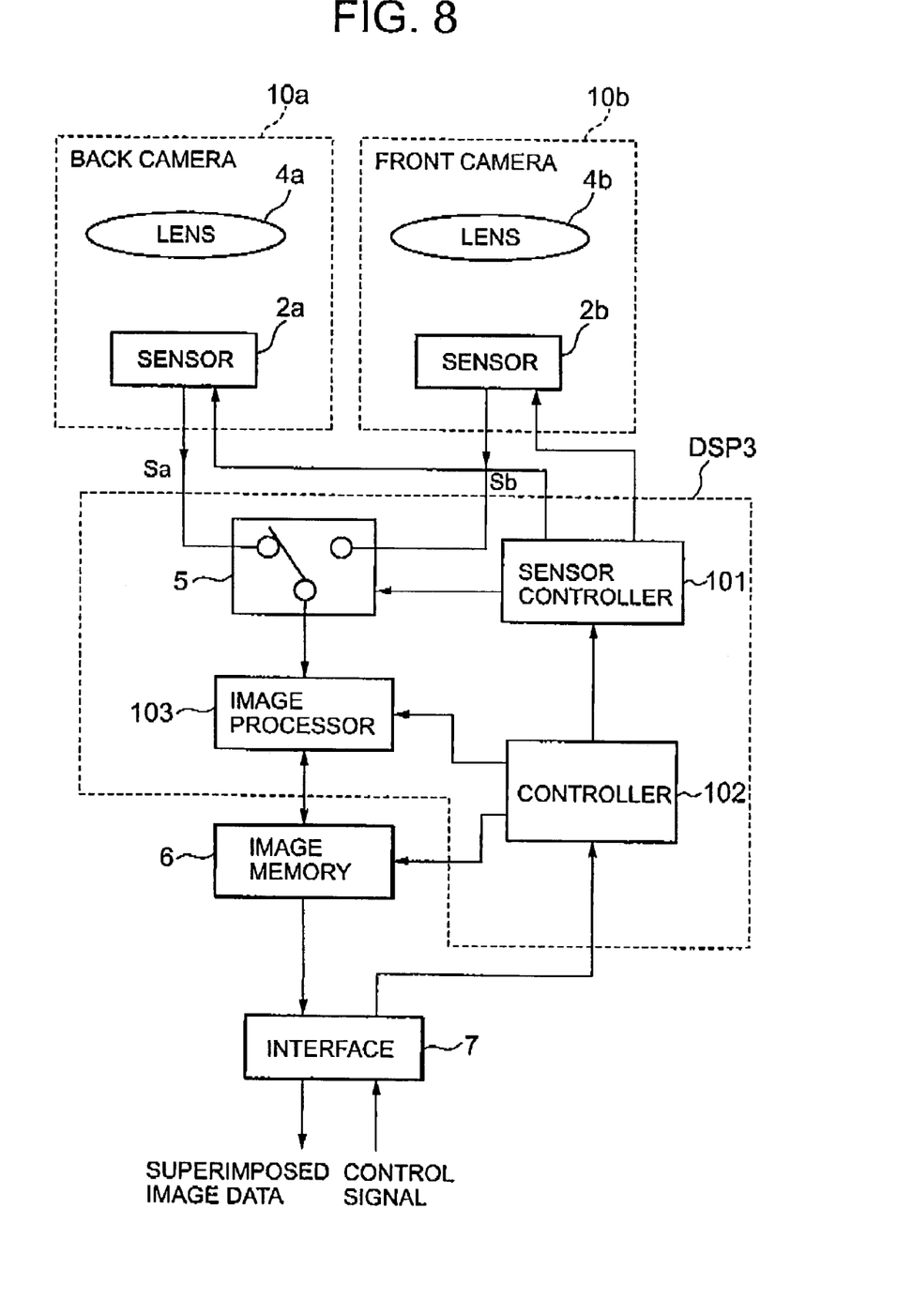
FIG. 8 is a detailed block diagram showing a camera device of FIG. 2.

In FIG. 8, the DSP 3 runs control programs to implement functions of the selector 5, a sensor controller 101, a controller 102 and an image processor 103. The sensor controller 101 controls the image sensors 2a and 2b under the control of the controller 102. More specifically, the image sensors 2a and 2b are driven by the sensor controller 101 to sequentially output background image data Sa and foreground image data Sb in units of a horizontal line to the image processor 103. The sensor control 101 also controls the selector 5 so as to alternately select the background image data Sa and the foreground image data Sb in units of a horizontal line. For example, at the leading edge of a timing clock pulse, the selector 5 selects an i-th horizontal line of background image data Sa to output it to the image processor 103 and, at the leading edge of a next timing clock pulse, the selector 5 selects an i-th horizontal line of foreground image data Sb to output it to the image processor 103. Since the selector 5 selects one of output background image data Sa and foreground image data Sb in units of a horizontal line, substantially concurrent background and foreground images can be captured and processed.

Under the control of the controller 102, the image processor 103 stores the background image data Sa and the foreground image data Sb onto the image memory 6 and performs the image processing thereof to produce superimposed image data as described before. The superimposed image data is sent to the microprocessor 61 of the main circuit 60 via the interface 7.

As described before, the use can select one of the back and front cameras 10a and 10b or control the position of the foreground image on the display 62 by operating the key pad 63. When a camera selecting instruction has been made, the controller 102 receives a camera selecting signal from the microprocessor 61 through the interface 7 and fixes the selector 5 to a selected position. When having received a foreground image position control signal, the controller 102 instructs the image processor 103 to change the foreground image to a user-instructed position. In this example, the background image data Sa and the foreground image data Sb are stored in the image memory 6 and therefore such position change on the display 62 can be made without recapturing the image data. Similarly, resizing the foreground image can be made.

Figure 9:
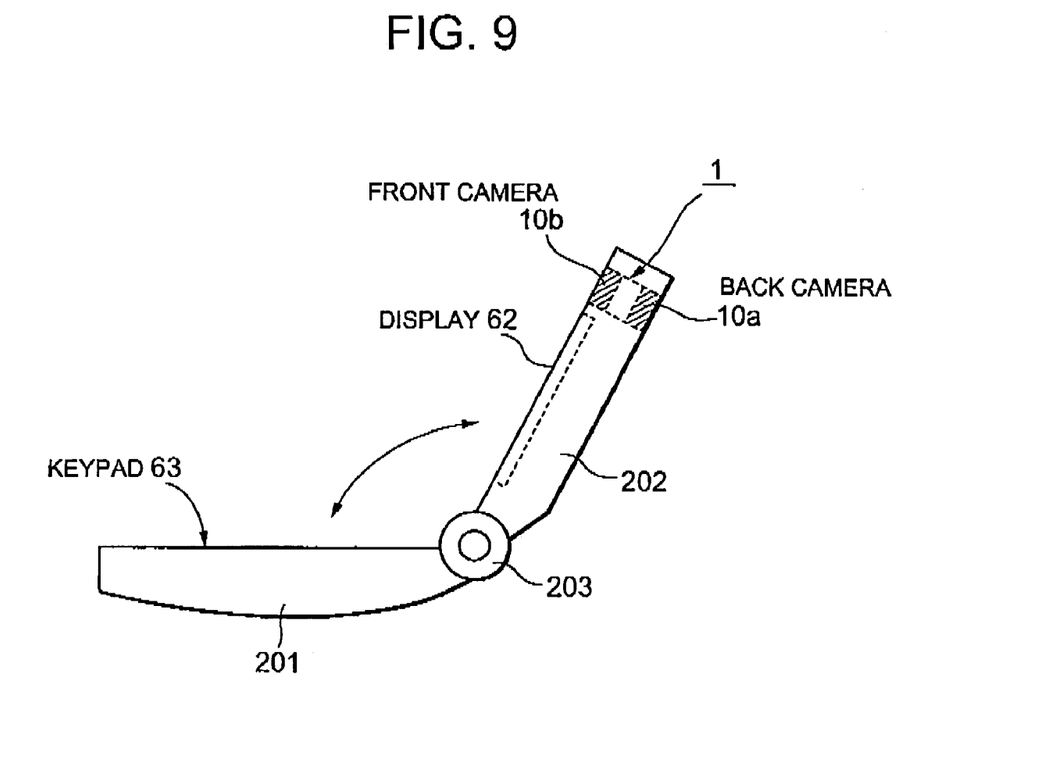
FIG. 9 is a schematic side view of a portable terminal having a camera device built therein according to the present invention.

Referring to FIG. 9, the portable telephone is composed of a first housing 201 and a second housing 202 which are rotatably coupled by a hinge 203. The first housing 201 includes a key pad 63 and the main circuit 60 (not shown). The second housing 202 includes the display 62 and the camera device according to the present invention. The front camera 10b of the camera device 1 is preferably placed at a position adjacent to the display 62. In this example, the front camera 10b is provided at a position just above the display 62.

The camera device 1 may be formed according to one of the first to fourth embodiments as described above. The back camera 10a and front camera 10b may be incorporated in one unit and placed at a predetermined upper position of the second housing 202. Alternatively, the back camera 10a and front camera 10b may be provided separately at different upper positions of the second housing 202.

In the above embodiments, the camera device 1 is limited to a twin-camera device. However, the present invention is not restricted to such a twin-camera device. The present invention can be applied to a multi-camera device including three or more cameras. In the case of the multi-camera device, the selector 5 sequentially selects a plurality of image data each captured by the cameras in units of a horizontal line or a frame.

The invention claimed is:

1. A camera device for portable equipment, comprising:
   a first camera and a second camera directed in different directions, each of the first camera and the second camera capturing an image to produce image data;
   a selector which alternately reads a single horizontal line of a first camera sensor of the first camera to store image data from the first camera in a memory, immediately followed by reading a horizontal line of a second camera sensor of the second camera to store image data from the second camera in the memory, immediately followed by reading another single line from the first camera sensor to store the image data from the first camera in a memory.

2. The camera device according to claim 1, wherein the image data captured by each of the cameras is moving-image data.

3. A camera device for a portable communication terminal, comprising:
   at least two cameras including a back camera and a front camera which are provided in the back and front of the portable communication terminal, respectively, wherein each of the front camera and the back camera capture an image to produce image data; and
   a selector which alternately reads a single horizontal line of a first camera sensor of the back camera to store image data from the back camera in a memory, immediately followed by reading a horizontal line of a second camera sensor of the front camera to store image data from the front camera in the memory, immediately followed by reading another single line from the first camera sensor to store the image data from the back camera in a memory.

4. A method for capturing a plurality of images in a portable communication terminal having at least two cameras including a back camera and a front camera which are each provided in the back and front of the portable communication terminal, wherein each of said at least two cameras captures an image to produce image data, said method comprising:

inputting image data from each of said at least two cameras;

reading, alternately, a single horizontal line of a first camera sensor of the back camera to store image data from the back camera in a memory, immediately followed by reading a horizontal line of a second camera sensor of the front camera to store image data from the front camera in the memory, immediately followed by reading another single line from the first camera sensor to store the image data from the back camera in a memory.

5. A method for capturing a plurality of images in a portable communication terminal having at least two cameras including a back camera and a front camera which are each provided in the back and front of the portable communication terminal, wherein each of said at least two cameras captures an image to produce image data, said method comprising the steps of:

inputting image data from each of said at least two cameras;

selecting first image data to store it in a memory;

reducing a size of second image data to initially store the second image data in the memory such that the second image data is overwritten on a portion of the memory storing the first image data; and outputting a superimposed image data such that a second image of the second image data is superimposed on a first image of the first image data, reading, alternately, a single horizontal line of a first camera sensor of the back camera to store image data from the back camera in a memory, immediately followed by reading a horizontal line of a second camera sensor of the front camera to store image data from the front camera in the memory, immediately followed by reading another single line from the first camera sensor to store the image data from the back camera in a memory.

6. A portable communication terminal with a moving-image communication function, comprising:

a display;

an operation key section;

a main circuit section including a microprocessor of the portable communication terminal; and a camera section, wherein the camera section comprises:

a back camera provided in the back of the portable communication terminal, wherein the back camera outputs first image data;

a front camera provided in the front of the portable communication terminal, wherein the front camera outputs second image data;

a memory for storing the first image data and the second image data produced by each of the back and front cameras; and a selector which alternately reads a single horizontal line of the stored first image data to store the first image data in a memory, immediately followed by reading a horizontal line of the stored second image data to store the second image data in the memory, immediately followed by reading another single line from the stored first image data to store the first image data in a memory, wherein the microprocessor instructs the display to display the superimposed image to be sent.

7. The portable communication terminal according to claim 6, wherein position and/or size of a second image of the second image data is allowed to be changed by the processor under control of the microprocessor depending on operations of the operation key section.

8. The camera device according to claim 1, further comprising a processor to produce output data of a superimposed image.

9. The camera device according to claim 3, further comprising a processor for processing the stored image data to produce output data of a superimposed image.

10. The method according to claim 4, further comprising superimposing the image data stored in the memory to produce a superimposed image data such that one image is superimposed on another.

11. The portable communication terminal according to claim 6, further comprising a processor for processing the stored image data to produce output data of a superimposed image.

12. The camera device according to claim 1, wherein the image data produced by the first camera sensor is a background image and the image data produced by the second camera sensor is a foreground image.

13. The camera device according to claim 3, wherein the image data produced by the first camera sensor is a background image and the image data produced by the second camera sensor is a foreground image.

14. The camera device according to claim 4, wherein the image data produced by the back camera is a background image and the image data produced by the front camera is a foreground image.

15. The camera device according to claim 6, wherein the first image data is a background image and the second image data is a foreground image.

16. The camera device according to claim 1, wherein the selector alternately selects between the first camera sensor and the second camera sensor in units of a single horizontal line.

17. The camera device according to claim 3, wherein the selector alternately selects between the front camera and the back camera in units of a single horizontal line.

18. The method according to claim 4, wherein the image data input is alternately selected from the front camera and the back camera in units of a single horizontal line.

19. The method according to claim 5, wherein the first image is a background image and the second image is a foreground image.

20. The camera device according to claim 1, wherein a frame of image data from the first camera sensor and a frame of image data from the second camera sensor are combined to form a single frame of image data in the memory.

* * * * *